UNITED STATES PATENT OFFICE.

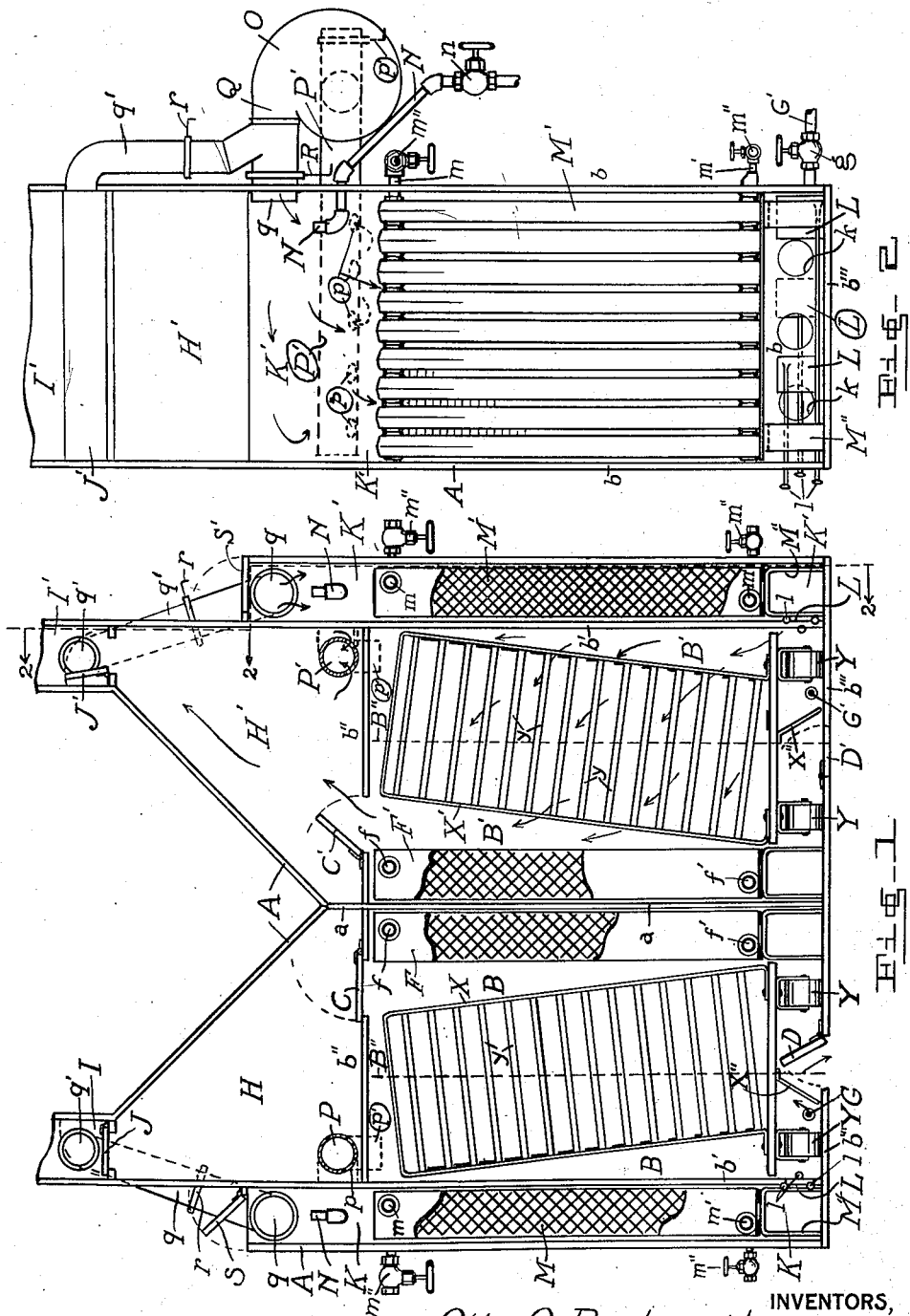

OTTO Q. BECKWORTH AND OLIVER J. HOBSON, OF CHICAGO, ILLINOIS, ASSIGNORS, BY MESNE ASSIGNMENTS, TO ANHYDROUS FOOD PRODUCTS COMPANY, A CORPORATION OF DELAWARE.

PROCESS AND APPARATUS FOR DEHYDRATING.

1,420,679.  Specification of Letters Patent.  Patented June 27, 1922.

Application filed January 27, 1919. Serial No. 273,228.

*To all whom it may concern:*

Be it known that we, OTTO Q. BECKWORTH and OLIVER J. HOBSON, citizens of the United States, and residents of Chicago, in the county of Cook and State of Illinois, have invented certain new and useful Improvements in Processes and Apparatus for Dehydrating, of which the following, when taken in connection with the drawing accompanying and forming a part hereof, is a specification.

This invention relates to a wet process for removing the water contents of meats, fish, fruits, vegetables and other substances without breaking down the cell structure thereof; and thereby retaining the color, appearance, natural and essential oils, flavors and food values thereof, and to an apparatus by means of which said process may be reduced to practice.

Among the objects of our invention is, to exclude ambient air from the substances being treated; to thoroughly moisten the surfaces thereof and to heat the same throughout, prior to the removal of moisture therefrom; to set up and maintain osmotic action during the time of removing moisture from the material being treated; to subject the material being treated to the action of a vapor medium of homogeneous condition and of predetermined densities and temperatures prior to its entry into the chamber containing said material where dehydration is effected; to accelerate osmosis and maintain the temperature of the medium and material being treated by the application thereto of radiant energy; to obtain an even and rapid distribution of heat within the dehydration chamber by the circulation therein of a previously prepared homogeneous vapor medium; to protect the material, during dehydration, from the injurious effects of heated air currents and deleterious light rays; to exclude ambient air from the dehydration chamber as its presence interferes with the even circulation of the vapor medium, retards osmotic action, and tends towards discoloration and loss of flavor by the breaking down of the cell structure; to maintain, as nearly as possible, an even temperature and humidity within and throughout the dehydration chamber; to gradually cool and condition the material after the same has been dehydrated; and such further objects, advantages and capabilities as will later more fully appear.

With these objects in view our process consists in moistening or wetting the surfaces of the material to be treated, in producing movement of the water inside said material, by osmosis and capillarity, to the surfaces thereof; and in removing the moisture from the surfaces of said material.

And we effect the foregoing by means of variation of density, vapor, and heat; all applied as and in the manner hereinafter set forth.

Our process consists; first, in placing the material to be treated, after the same has been properly prepared, in the chamber of an apparatus, from which chamber ambient air can be expelled and excluded, and the introduction into said chamber of a vapor, to expel said ambient air therefrom and to bring said vapor into contact with said material at a high density, to well moisten the surfaces of the material; and at a temperature sufficient, in combination with radiant energy, to heat the material throughout, thereby loosening the structure of said material to permit an easy passage of the moisture contained therein through the cell walls thereof. The temperature required will necessarily vary with different substances treated, the range being, approximately, between 170° and 212° F.; also the time will vary correspondingly with the variation in size, texture and composition of the material, as it must not be subjected to this step long enough to cook it, or to cause undesirable chemical change to take place therein.

Preferably this vapor is introduced at substantially the dew point, or point of saturation thereof, thereby hastening the deposit of moisture on the surfaces of said material and more quickly heating the substance thereof.

During the deposit of moisture on the surfaces of said material any reduction of temperature of said vapor is compensated for by a continued additional supply of vapor and radiant energy.

From the foregoing recited step the transition to the next step is, by us, an operation having for its object the setting up of osmosis within the material being treated, whereby, aided by capillarity, the water contents of said material will flow outward therethrough to the surface thereof, to be removed therefrom.

Hence, after the material being treated in the recited manner has been properly conditioned, a portion of the vapor medium is discharged from said dehydrating chamber through suitably constructed dampers and stack, and the remaining portion of said vapor medium is, to control the same, by us circulated by means of a fan, and, together with additional vapor, passed over radiators or other heating means which are located in a separate chamber or compartment adjacent to and communicable with said dehydrating chamber before being again introduced thereinto; the portion of said vapor medium which is discharged from said stack being compensated for, to the exclusion of ambient air, by said additional vapor and travel over said heating means.

The vapor passed, as above, over the heating means in said separate chamber or compartment is of a comparatively low density when discharged into said dehydrating chamber, and said discharge is made below, (underneath) the material which is being treated and circulates upwardly and among said material, and moves from said material towards the source of radiant energy. Said circulating medium being of less density than the moisture within the material, a gentle, but rapid, osmosis through the cell walls of the material to the surfaces is set up.

The movement to the surfaces of said material of the moisture which accumulates in the inter-collular spaces thereof, by said osmosis, is assisted and accelerated by capillarity. Removal or dispersion of said moisture from said surfaces is effected by vaporization, molecular attraction, and evaporation.

Because of the diffusibility of vapor a more uniform condition of the circulating medium throughout the dehydrating chamber prevails when vapor only is contained therein than when air and vapor are circulated therethrough.

The temperature and expansion of the vapor medium circulating in the dehydration chamber and the temperature and action occuring in the body of the material being treated are controlled and materially assisted by means of radiant energy obtained from the heated radiators which are positioned in said chambers so that said energy is expended in said material and on said vapor medium during the passage of said vapor medium over, and subsequent to its contact with, said material.

The continuous discharge of some of the vapor medium and the continued return of some thereof, together with additional vapor, to said dehydrating chamber, in the manner recited, is maintained until sufficient dehydration of the material is obtained.

Attention is directed to the fact that at the commencement of this stage of the process a vapor of a lower temperature and density is introduced into the dehydrating chamber, but the temperature of the material which is being treated is not necessarily reduced below 130° F., even in the treatment of substances having a very delicate structure or highly volatile constituents, and the temperature of said vapor medium must be controlled and regulated in such a manner that the temperature of said material, while being kept in a well warmed condition, will not approach too closely to the cooking point.

When the water content of the material which is being treated by the hereinbefore described steps is sufficiently reduced, for the purpose of gradually cooling the dehydrated material, the circulating vapor medium is discharged from the dehydrating chamber and a moist ambient air is inducted thereinto, it being first passed over the heating means located in said adjacent chamber or compartment, to circulate in said dehydrating chamber and among said material at a temperature approximating the temperature of said material; said temperature and moisture being gradually reduced at the same time the material continues to be acted upon by the radiant energy from the radiators in the dehydrating chamber; until the cell structure is properly shrunk and closed. This last operation not being for the purpose of removing moisture, except from the surface of the material, but for conditioning the product for proper preservation and restoration, should be of comparatively short duration, in order that the product may not become unnecessarily hard and dry.

In the drawing which illustrates an apparatus by means of which our process is reduced to practice by us, two units are shown in Fig. 1, one thereof being in position to carry out the first step thereof and the other to reduce to practice the second step; and in said drawing—

Fig. 1 illustrates a front elevation of a structure with the front wall removed, to expose to view the internal construction and movable members; and Fig. 2 a side elevation with the side removed, the construction being viewed on line 2—2 of Fig. 1, in the direction indicated by the arrows.

A reference character applied to designate a given part indicates said part throughout the several figures of the drawing, wherever the same appears.

A represents the structural housing of the apparatus, $a$ being the partition separating the units in said housing. B, B' indicate dehydrating chambers; $b$, $b$, the back and front walls of the structure; $b'$, $b''$, $b'''$, the side walls, top and bottom or floor of the apparatus, and B'' the meeting line of doors through which trucks, (X, X'), are placed in and removed from the dehydrating chambers. C, C' represent dampers in top, (or ceiling) of chambers B, B'; and D, D', dampers in the bottom or floor $b'''$, of said chambers. F, F' represent heaters in chambers B, B'. Heaters F, F', are illustrated as steam radiators, $f$ indicating a steam inlet to each of said radiators, and $f'$ a discharge pipe or outlet. X'', X'', represent baffle plates on the under side of trucks X, X', respectively. Y, Y, represent wheels to trucks X, X'. $y$, $y$, indicate trays on trucks X, X', adapted to have material disposed thereon to be treated. G, G', represent steam supply pipes arranged to discharge therefrom steam which is introduced thereby into dehydrating chambers B, B', respectively, and said discharge is controlled by a valve in each of said pipes. The valve in pipe G' is illustrated in Fig. 2, and lettered $g$, and is a duplicate of the valve in pipe G. H, H', indicate spaces or chambers located in the units illustrated, above the dehydrating chambers B, B', respectively; said spaces being separated from said chambers and put into controlled communication therewith by means of dampers C, C', before referred to. I, I', represent stacks from spaces or chambers H, H', respectively, and said spaces or chambers are put into controlled communication with said stacks by means of dampers J, J'. K, K', represent chambers or compartments which are adjacent to the dehydrating chambers B, B', and are put into controlled communication therewith by means of apertures $k$, $k$, and dampers L, L. The position of said dampers L, L, is controlled by the connections $l$, $l$. M, M' represent heaters in the compartments K, K', respectively, and M'' indicate inverted U-shaped standards which form the supports of said heaters. $m$, represent steam inlet pipes and $m'$ discharge pipes to and from said heaters, respectively. N, N, represent steam supply pipes which are each, respectively, provided with a valve, $n$, and which are adapted to discharge, by the manipulation of said valve, a controlled quantity of steam therefrom, which is thereby introduced into the chambers K, K'. O, indicates an air exhaust, or compressor, (there being one thereof to each unit), which is illustrated as a centrifugal fan. P, P', represent inlet pipes or ducts, to the fans of the units, and Q an outlet pipe or conduit from fan O. $p$, $p$, indicates apertures in duct P', (see Fig. 2), by means of which said duct is in communication with space or chamber H'. Similar apertures are in duct P to establish communication between space H and said duct. $p'$ indicates a damper in duct P'. Damper $p'$ being open ambient air is admitted to duct P' and fan O. Outlet Q of fan O, of a given unit, is bifurcated, the branch $q$ thereof being arranged to discharge into chamber K, (and K'), said discharge being arrested and controlled by damper R; and the branch $q'$ arranged to discharge into stack I, (and I'), said discharge being arrested and controlled by damper $r$. S, S', represent dampers or valves, by means of which communication is established and controlled between the atmosphere and chambers K, K', respectively.

To reduce the process embodying our invention to practice by means of the described apparatus, the material which is to be dehydrated is properly prepared, as by cleaning and trimming, and disposed on the trays $y$, $y$, of a truck, (say X), and said truck is then put in a dehydrating chamber, (say B), and the doors thereof closed.

It being assumed that what we term the first step of the process is to be reduced to practice in chamber B, the several dampers are arranged in the position in which they are illustrated in Fig. 1, relative to said chamber. That is, the dampers C, L, L, are closed, the valve in pipe G, and the damper D are open, (to admit steam into and expel air from said chamber). Steam flowing into said chamber is directed upward by baffle plate X'', and as said steam enters, the ambient air in said chamber flows therefrom, through the aperture in the floor $b'''$ which is controlled by damper D. The steam thus flowing into said chamber is of high density, that is, saturated and near the dew point, and of high temperature. Simultaneously with the admission of said steam into chamber B from pipe G, steam is admitted to radiator F, and said radiator is well warmed. The damper D is continuously open until all the ambient air in chamber B is discharged therefrom through the aperture controlled by said damper, whereupon said damper is closed. The admission of steam at a high temperature and of high density is continued through pipe G; and the admission of steam to thoroughly heat the radiator F is continued, (through inlet $f$), until the material which is being treated is well covered with moisture, that is, well wetted, and well heated throughout the entire substance thereof; said heating of the material being effected by the combined action of steam in said chamber and radiant energy, from said radiator. Radiant energy from said radiator also increases the temperature of the steam in said chamber, nevertheless, the work performed by said steam in its heating of said material produces water of condensation which is deposited on the material, thereby moistening or wetting said material, as above referred to.

Chamber B being closed, as illustrated, at the top thereof, during the above recited step of the process there will be no circulation of the vapor contents thereof, and the ambient air being expelled before the closing of the damper D, a uniform temperature will prevail throughout the chamber.

The foregoing recited conditions are continued until the material is properly heated throughout to, say, a temperature of not less than one hundred and sixty degrees F., whereupon dampers C, J, and L are opened; that is, the several dampers to said chamber are put into position, substantially corresponding with the position in which said dampers are illustrated in the unit containing chamber B', and a circulation of the vapor medium is established. The valves $m''$, $m''$, to and from radiator M having been previously opened and said radiator heated, the fan of the unit is started and some of said vapor medium is discharged through stack I.

The several elements of the unit of which the dehydrating chamber B is a member are at this stage or step of the process in the position in which they are illustrated in the unit of which chamber B' is a member, the damper D in floor $b'''$, damper $r$ in branch $q'$, damper $p'$ and damper S being closed, valve $g$ to steam supply pipe G being closed, and valve $n$ to the steam supply pipe N open; and the reference characters about to be recited in describing the second step of our process, which we assume to be carried on in chamber B after the completion of the first step therein, are applied to said chamber B', as if said step were being carried on in said unit having chamber B' as an element thereof.

The circulating vapor medium which flows upward through the damper C' into space or chamber H' flows through apertures $p$, $p$, into duct P', from thence into and through fan O, outlet Q and branch $q$, into chamber or compartment K'. Simultaneously with the discharge of said vapor medium into said compartment K' steam is admitted thereinto through pipe N. The steam so discharged from pipe N is sufficient together with the vapor medium from branch $q$, to compensate, when expanded, substantially for the flow of vapor medium through stack I'.

The vapor medium and steam delivered into chamber or compartment K', from branch $q$ and pipe N as last above described, move downward in said compartment, passing over and through between the several members of heater M', thereby becoming thoroughly intermixed and expanded into a homogeneous mass, and dampers L, L, being wholly or partially open, (as required), said mass enters the dehydrating chamber B' near the bottom thereof, and circulates upward and among the material which is being treated, said material being disposed on trays $y$, $y$, $y$.

The vapor medium which is discharged into the dehyrating chamber through apertures $k$, $k$, expanded by its movement over and contact with heater M', flows into said chamber in a less dense condition than is the vapor medium which flows from said chamber through damper C', and during its upward flow and circulation in said chamber radiant energy from radiator F' tends to continuously lessen said density. Rapid removal of the moisture on the surfaces of the material is effected, and the osmotic action and capillarity in said material are continuous.

This step of the process is continued until the desired dehydration of the material is obtained; and said material being sufficiently dehydrated, the temperature of the circulating medium is lowered to substantially the temperature of said material. This last action is obtained by opening damper S', at the upper end of chamber K', closing damper R, and opening damper $r$. The vapor medium which is discharged from said dehydrating chamber at this stage of the process, through apertures $p$, $p$, of duct P' and fan O, flows into stack I'; and a flow of air is thereby induced through said damper S', communicating chamber or compartment K' and into said dehydrating chamber.

In case it should occur that the temperature of the intermixed vapor medium and steam, when delivered as a homogeneous mass or volume into the dehydrating chamber, (through apertures $k$, $k$), is higher than is desired, the dampers $p'$ and R, may be wholly or partially opened, and damper $r$ closed, for a short time, and air admitted to fan O. The air so admitted flows downward in chamber K', along with the vapor medium which also is discharged from said fan, and with steam discharged from said fan, and with steam discharged from pipe N, becomes thoroughly intermixed therewith while passing over the heater M'; and all said elements become, and are, when discharged through the apertures $k$, $k$, and so introduced into the dehydration chamber, a homogeneous vapor medium, having no free or ambient air therein. It is to be understood that when this step of the process is properly carried into effect the opening of the damper $p'$, as last above set forth, is unnecessary, and the opening thereof as recited is not a part of said step; but is a means for correcting any error made in said step, and a return thereto, without the admission of ambient air to said dehydration chamber.

While the apparatus illustrated and described herein is well adapted to be used in the reduction of our process to practice we do not desire to be understood as limiting said reduction to the use of said apparatus. In an apparatus which is adapted for what we consider a successful reduction of this process to practice, the current, or flow, of the vapor medium in the dehydration chamber should be so directed that said vapor medium shall not flow on or over the sources of raidant energy and from thence to or over and among said material, before the heat imparted thereby to said vapor medium is properly diffused.

Any desired number of units may constitute an installation of this or any apparatus adapted to be used in the reduction of the process to practice.

We claim:—

1. A process of dehydration which comprises placing substances in a chamber, excluding the atmosphere from said chamber with the introduction thereinto of a vapor medium of high density and temperature, continuously applying said vapor medium to said substances a sufficient time to deposit moisture on the surfaces thereof and to thoroughly warm said substances, but not to cook the same, supplying radiant energy in said chamber to additionally warm said substances, subsequently, and while continuously applying said radiant energy, substituting for said vapor medium and circulating it in said chamber and among said substances, a vapor medium of less density and less temperature than the vapor medium replaced thereby, to move to the surfaces of said substances, by osmosis and capillarity, the desired percentage of the moisture contained therein, said substitution including the removal of said first named vapor medium from said dehydrating chamber, the mixing of some thereof with additional vapor, the subsequent passing of said mixture over heating devices to obtain a homogeneous mass and the expansion thereof, and the subsequent introduction of said homogeneous expanded vapor into said dehydrating chamber in sufficient quantity to compensate in volume for the vapor medium removed therefrom, and continuing said removing, mixing, expanding and introduction, to thereby effect removal of moisture from said substances and from the surfaces thereof, and subsequently applying and gradually reducing the temperature of the circulating medium and substances, to gradually condition said substances.

2. A method of dehydration whereby the material to be treated is first immersed, to exclude ambient air therefrom, in a fluid of high density and temperature a sufficient time to thoroughly moisten the surface thereof and heat the same throughout, and subsequently subjected to the action of a continuously circulating homogeneous vapor medium of a density below the dew point in a dehydration chamber in which radiant energy is supplied and from which the air is expelled and ambient air is continuously excluded, and, while continuously allowing a portion of said vapor medium to escape, continuously maintaining within and throughout said chamber a homogeneous condition and determined density of said circulating medium, by circulating the remaining portion of said vapor medium, together with additional vapor added thereto, through and over heaters in an additional chamber, to lower the density thereof by expansion and mix the same in a homogeneous mass before it enters the dehydration chamber, and introducing it to said dehydration chamber to circulate among the material being treated, continuing this operation until the proper degree of dehydration is attained in the material, and subsequently expelling a gradually increasing amount of the circulating vapor medium and substituting, for, and in lieu of the vapor added to the returned circulating medium, a compensating quantity of ambient air, and the circulation of this medium continuously maintained and the temperature thereof gradually reduced until the material treated is fully cooled and properly conditioned.

3. The process of dehydrating substances which consists in expelling air therefrom and surrounding said substances with saturated vapor at a high temperature, thereby thoroughly warming said substances throughout and depositing moisture on the surfaces thereof, and simultaneously applying radiant energy to additionally warm said substances, in subsequently lessening the density of the vapor surrounding said substances and producing movement to the surfaces thereof of moisture contained therein, in continuously applying radiant energy to said substances and continuously removing moisture from said surfaces by continuously maintaining in said surrounding vapor less density and higher temperature than prevails in said substances, in continuously lessening the density of said surrounding vapor correspondingly with the lessening of the moisture in said substances, and in subsequently conditioning said substances.

4. A process of dehydrating substances wherein the material to be dehydrated is placed in a chamber and continuously acted upon by radiant energy and while being so acted upon is successively subjected to the action of a surrounding body of vapor introduced therein from a source outside of said chamber of high temperature and density with ambient air excluded therefrom, then to the action of expanded vapor of less density, some whereof is introduced from an outside source to the continued exclusion of ambient air, then to the action of warmed air which is continuously supplied and the temperature whereof is gradually reduced to properly cool and condition said substances.

5. A process of dehydration whereby, having been previously thoroughly moistened on the surfaces and warmed throughout the body thereof, the material which is being treated is subjected to the action of radiant energy and vapor of low density, some thereof introduced from an outside source and independent of vapor from said material and ambient air excluded therefrom, and the continuous maintenance of said conditions and actions until sufficient of the moisture in said material is removed therefrom, subsequently subjecting said material to the action of a continuous current of warm air, and gradually lessening the temperature of said air to gradually cool said material until said material is properly cooled and conditioned.

6. A process of dehydrating substances which comprises the disposal of said substances in a chamber, the expelling of air and immersing said substances in a vapor medium, continuously supplying radiant energy within said chamber and continuously maintaining said vapor medium at a higher temperature and less density than the temperature and density of said substances, by the continuous addition of vapor from a vapor supply, and continuously excluding air from said chamber, until a predetermined per cent of the moisture in said substances is removed therefrom, and in then immersing said substances in air the temperature whereof is substantially the temperature of said substances, and in continuously lessening the temperature of said immersing air to correspondingly continuously lessen the temperature of said substances to cool and condition the same.

7. In an apparatus for dehydrating substances, a plurality of chambers, controllable means to establish and obstruct communication between said chambers, radiators positioned in one of said chambers and heaters in an additional one thereof, said radiators disposed in said chambers to heat by radiant energy, and said heaters disposed to heat by conduction and convection, means to control the temperature of said radiators, respectively, and means to control the temperature of said heaters, controllable means to introduce vapor into said radiator chamber, and controllable means positioned in advance of the heaters therein, to introduce vapor into said heater chamber, controllable means to establish and obstruct communication between said radiator chamber and the atmosphere, controllable means to discharge, from the top thereof and subsequent to its flow therethrough, vapor from said radiator chamber, and controllable means to transfer a portion of said vapor so discharged from said radiator chamber and deliver the same into said heater chamber, the introduction of said vapor into said heater chamber arranged so that said vapors flow therethrough and over said heaters to become mixed and expanded by said flow before being discharged therefrom and introduced into said radiator chamber.

8. A unit of a dehydrating apparatus comprising in combination, a dehydrating chamber, a supply chamber and a discharge chamber, means to selectively and controllably establish and obstruct communication between said chambers, and between said chambers and the atmosphere, means to dispose in said dehydrating chamber substances to be determinably dehydrated, controllable means to introduce vapor of high density and temperature into said dehydrating chamber and around said substances, and controllable means to continuously supply radiant energy in said dehydrating chamber, controllable means to supply vapor to said supply chamber, and controllable means to transfer vapor from said discharge chamber to said supply chamber, said supply chamber arranged for the flow therethrough of vapors delivered thereinto, and controllable means positioned in said supply chamber to mix and reduce the density of vapors flowing therethrough.

9. A unit of a dehydrating apparatus comprising in combination, a dehydrating chamber, a supply chamber, and a discharge chamber, means to selectively and controllably establish and obstruct communication between said supply chamber and dehydrating chamber, between said dehydrating chamber and said discharge chamber, between said discharge chamber and said supply chamber, between said dehydrating chamber and the atmosphere and between said discharge chamber and the atmosphere, means to dispose material in said dehydrating chamber, controllable means to introduce vapor of high temperature and density into said dehydrating chamber and around said material, controllable means to continuously supply radiant energy in said dehydrating chamber, controllable means to supply vapor to said supply chamber, and controllable means, including a fan, ducts thereto and dampers to said ducts, to transfer vapor from said discharge into said supply chamber, said supply chamber arranged for the flow therethrough of vapors delivered thereinto, and controllable means positioned in said supply chamber to mix and reduce the density of vapors flowing therethrough.

10. The steps in the process of dehydrating substances, which consists in introducing into the chamber containing the substances vapor from an outside source and of high temperature and density, in driving the ambient air previously in the chamber out therefrom as the said vapor enters, and subjecting the substances to the action of said vapor and to radiant energy to the exclusion of ambient air.

11. The steps in the process of dehydrating substances, which consists in introducing into the chamber containing the substances vapor from an outside source and of high temperature and density, in driving the ambient air previously in the chamber out therefrom as the said vapor enters, and subjecting the substances to the action of said vapor and to radiant energy to the exclusion of ambient air, and then to the action of expanded vapor of less density to the continued exclusion of ambient air.

12. The steps in the process of dehydrating substances, which consists in introducing into the chamber containing the substances vapor from an outside source and of high temperature and density, in driving the ambient air previously in the chamber out therefrom as the said vapor enters, and subjecting the substances to the action of said vapor and to radiant energy to the exclusion of ambient air, and then to the action of expanded vapor of less density to the continued exclusion of ambient air, and then adding to said chamber gradually increasing amounts of warmed air to condition said substances.

13. That step in the process of dehydrating substances, which consists in subjecting the substances being treated to the action of vapor of high temperature and density, and radiant heat to the exclusion of ambient air, which latter is driven out as the vapor fills the drying chamber.

14. In an apparatus of the class described, a dehydrating chamber adapted to receive material to be treated, means to maintain a vapor medium of high temperature and density around said material to heat and moisten the same, means to apply radiant heat to said vapor and material, means to remove a portion of said vapor medium from said chamber, means to add to said chamber additional vapor of high temperature and less density than said first named vapor medium, means to circulate through said chamber vapor and air, and means to control the temperature thereof to gradually cool and condition said material.

15. The process of dehydrating substances which consists in subjecting said substances to the action of vapor of high temperature and density, and radiant heat, to warm said substances and moisten the surface thereof, in then subjecting said substances to the action of vapor of less density and continuing the radiant heat, to produce movement to and removal from the surface of said substances moisture contained therein, and in continuously lessening the temperature and density of said last mentioned vapor as the moisture decreases in said substances, to cool and condition the same.

OTTO Q. BECKWORTH.
OLIVER J. HOBSON.

Witnesses:
E. A. WINCHELL,
CHARLES TURNER BROWN.